(12) United States Patent
Peace et al.

(10) Patent No.: US 11,527,228 B2
(45) Date of Patent: Dec. 13, 2022

(54) FAIRINGS FOR POWER GENERATION MACHINES

(71) Applicant: ROLLS-ROYCE plc, London (GB)

(72) Inventors: Richard Peace, Derby (GB); Oliver C. Taylor-Tibbott, Lichfield (GB); John G. Marshall, Derby (GB)

(73) Assignee: Rolls-Royce PLC, London (GB)

(*) Notice: Subject to any disclaimer, the term of this patent is extended or adjusted under 35 U.S.C. 154(b) by 984 days.

(21) Appl. No.: 16/266,411

(22) Filed: Feb. 4, 2019

(65) Prior Publication Data
US 2019/0259364 A1    Aug. 22, 2019

(30) Foreign Application Priority Data
Feb. 21, 2018   (GB) ..................... 1802768

(51) Int. Cl.
| | | |
|---|---|---|
| *G10K 11/168* | (2006.01) | |
| *F01D 25/24* | (2006.01) | |
| *F02C 7/24* | (2006.01) | |
| *G10K 11/172* | (2006.01) | |
| *H02K 5/24* | (2006.01) | |
| *H02K 7/18* | (2006.01) | |
| *F02K 1/82* | (2006.01) | |
| *F02C 7/045* | (2006.01) | |

(52) U.S. Cl.
CPC ............ *G10K 11/168* (2013.01); *F01D 25/24* (2013.01); *F02C 7/045* (2013.01); *F02C 7/24* (2013.01); *F02K 1/827* (2013.01); *G10K 11/172* (2013.01); *H02K 5/24* (2013.01); *H02K 7/1823* (2013.01); *F05D 2260/963* (2013.01); *F05D 2300/603* (2013.01); *F05D 2300/613* (2013.01); *G10K 2210/32272* (2013.01)

(58) Field of Classification Search
CPC . F02C 7/045; F02C 7/24; F02K 1/827; G10K 11/168; G10K 11/172; G10K 2210/32272; H02K 5/24; H02K 7/1823; F01D 25/24; F05D 2260/963
USPC ........................................................ 181/292
See application file for complete search history.

(56) References Cited

U.S. PATENT DOCUMENTS 3,542,152 A  * 11/1970  Oxx, Jr. .................... B32B 3/12
                                                            415/200
4,240,250 A  * 12/1980  Harris ..................... F02C 7/045
                                                            60/39.093
(Continued)

FOREIGN PATENT DOCUMENTS

DE     4340951 A1 *  6/1994  ............. B64D 33/02
EP     1845018       10/2007
(Continued)

OTHER PUBLICATIONS

Final Office Action from U.S. Appl. No. 16/197,557, dated Sep. 23, 2021, 15 pp.
(Continued)

*Primary Examiner* — Jeremy A Luks
(74) *Attorney, Agent, or Firm* — Shumaker & Sieffert, P.A.

(57) ABSTRACT

A fairing for a power generation machine, the fairing comprising: a first layer comprising a metallic material; a second layer comprising a composite; and a third layer positioned between the first layer and the second layer, the third layer being configured to attenuate acoustic waves over a predetermined frequency range.

14 Claims, 6 Drawing Sheets

(56) References Cited

U.S. PATENT DOCUMENTS

| | | | |
|---|---|---|---|
| 4,441,578 A | | 4/1984 | Rose |
| 4,705,454 A | | 11/1987 | Bouiller et al. |
| 4,735,841 A | | 4/1988 | Sourdet |
| 4,751,979 A | * | 6/1988 | Wiseman .................. F02C 7/24 181/213 |
| 4,858,721 A | | 8/1989 | Autie et al. |
| 5,041,323 A | | 8/1991 | Rose et al. |
| 5,447,411 A | | 9/1995 | Curley et al. |
| 5,806,796 A | | 9/1998 | Healey |
| 5,923,003 A | * | 7/1999 | Arcas ...................... F02K 1/827 181/292 |
| 6,123,170 A | * | 9/2000 | Porte ...................... B64D 33/02 239/265.17 |
| 6,182,787 B1 | * | 2/2001 | Kraft ...................... F02C 7/045 181/292 |
| 8,579,225 B2 | | 11/2013 | Mardjono ................. F02K 3/06 244/1 N |
| 8,695,720 B2 | | 4/2014 | Mickelsen et al. |
| 8,757,319 B2 | * | 6/2014 | Bouteiller ................. F02C 3/13 244/1 N |
| 9,592,918 B2 | * | 3/2017 | Yu .......................... B64D 33/06 |
| 2012/0102912 A1 | | 5/2012 | Izadi et al. |
| 2013/0223973 A1 | | 8/2013 | Ali |
| 2013/0223977 A1 | * | 8/2013 | Ali ......................... F02K 1/827 415/119 |
| 2014/0325823 A1 | | 11/2014 | Ferrer et al. |
| 2015/0136875 A1 | * | 5/2015 | Lacko ...................... F02K 1/70 239/265.19 |
| 2015/0285144 A1 | * | 10/2015 | Todorovic ............. F01D 25/243 137/15.1 |
| 2016/0024963 A1 | * | 1/2016 | Lumbab .................. F02C 7/045 29/896.2 |
| 2016/0215700 A1 | * | 7/2016 | Yu .......................... B64D 33/02 |
| 2016/0327061 A1 | | 11/2016 | Mandel et al. |
| 2017/0328281 A1 | * | 11/2017 | Pretty ..................... F02K 1/827 |
| 2018/0029719 A1 | * | 2/2018 | Follet ....................... B64F 5/10 |
| 2018/0363558 A1 | * | 12/2018 | Weaver ................... F02C 7/045 |
| 2019/0178106 A1 | | 6/2019 | Peace et al. |
| 2022/0042455 A1 | * | 2/2022 | Guillois ................. B64D 33/02 |

FOREIGN PATENT DOCUMENTS

| | | | |
|---|---|---|---|
| EP | 2026325 A2 | 2/2009 | |
| EP | 2292514 | 3/2011 | |
| FR | 2727725 A1 * | 6/1996 | ........... B64C 21/025 |
| GB | 2029881 A | 3/1980 | |
| GB | 2547049 | 8/2017 | |
| WO | 2012076876 A1 | 6/2012 | |

OTHER PUBLICATIONS

Response to Office Action dated Sep. 23, 2021, from U.S. Appl. No. 16/197,557, filed Nov. 23, 2021, 8 pp.

Extended European Search Report from counterpart EP Application No. 19152952.8 dated Jun. 21, 2019, 8 pgs.

Response to Extended European Search Report from counterpart EP Application No. 19152952.8 dated Jun. 21, 2019, filed Feb. 24, 2020, 40 pgs.

Office Action from U.S. Appl. No. 16/197,557 dated Mar. 6, 2020, 15 pgs.

Response to Office Action from U.S. Appl. No. 16/197,557 dated Mar. 6, 2020, filed Jun. 8, 2020, 7 pgs.

Final Office Action from U.S. Appl. No. 16/197,557 dated Sep. 14, 2020, 14 pgs.

Advisory Action from U.S. Appl. No. 16/197,557, dated Dec. 21, 2020, 3 pp.

Notice of Allowance from U.S. Appl. No. 16/197,557, dated Jan. 4, 2022, 7 pp.

Response to Office Action dated Mar. 1, 2021, from U.S. Appl. No. 16/197,557, filed Jun. 1, 2021, 8 pp.

Great Britain search report dated Jun. 7, 2018, issued in GB Patent Application No. 1720603.8.

Great Britain search report dated Aug. 6, 2018, issued in GB Patent Application No. 1802768.0.

Office Action from U.S. Appl. No. 16/197,557, dated Mar. 1, 2021, 12 pp.

Notice of Allowance from U.S. Appl. No. 16/197,557, dated Apr. 19, 2022, 5 pp.

* cited by examiner

FAIRINGS FOR POWER GENERATION MACHINES

CROSS-REFERENCE TO RELATED APPLICATIONS

This specification is based upon and claims the benefit of priority from UK Patent Application Number 1802768.0 filed on 21 Feb. 2018, the entire contents of which are incorporated herein by reference.

BACKGROUND

Technological Field

The present disclosure concerns fairings for power generation machines.

Description of the Related Art

Power generation machines (such as gas turbine engines, reciprocating engines, and electrical machines) may be mounted on a vehicle to provide propulsion and/or to generate electrical power. A fairing may be provided around the power generation machine to reduce the drag caused by the power generation machine when the vehicle is in motion.

SUMMARY

According to a first aspect there is provided a fairing for a power generation machine, the fairing comprising: a first layer comprising a metallic material; a second layer comprising a composite; and a third layer positioned between the first layer and the second layer, the third layer being configured to attenuate acoustic waves over a predetermined frequency range.

The second layer may define a plurality of apertures. The third layer may define a plurality of cavities. The plurality of apertures and cavities may be aligned and define a plurality of Helmholtz resonators.

The third layer may comprise a honeycomb structure.

The third layer may comprise a mesh.

The first layer may define a receptacle and the third layer may be positioned within the receptacle.

The third layer may be bonded to the first layer.

The first layer may define a first surface and a second opposite surface. The first layer may be configured to enable the fairing to be coupled to the power generation machine.

The first layer may be configured to couple to the power generation machine via one or more fasteners.

The first surface of the first layer may comprise a portion that is shaped to match a surface of the power generation machine. The portion may be for being adhered to the power generation machine.

The second layer may define a first surface and a second opposite surface. The second surface of the second layer may define an external surface of the fairing.

The first layer may be configured to enable the fairing to comply with ISO2685:1998.

The second layer may comprise no protrusions extending from the second surface to minimize excrescence drag.

The first surface of the first layer may have a concave shape. The second surface of the second layer may have a convex shape.

The metallic material of the first layer may comprise aluminium or titanium.

The composite material of the second layer may comprise a carbon composite or an oxide ceramic matrix composite.

According to a second aspect there is provided apparatus comprising a power generation machine and a fairing as described in the preceding paragraphs, the first layer of the fairing being coupled to the power generation machine.

The power generation machine may be a gas turbine engine.

The power generation machine may be an electrical machine.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

DESCRIPTION OF THE DRAWINGS

Embodiments will now be described by way of example only, with reference to the Figures, in which.

DETAILED DESCRIPTION

In the following description, the terms 'connected' and 'coupled' mean operationally connected and coupled. It should be appreciated that there may be any number of intervening components between the mentioned features, including no intervening components.

Figure 1:
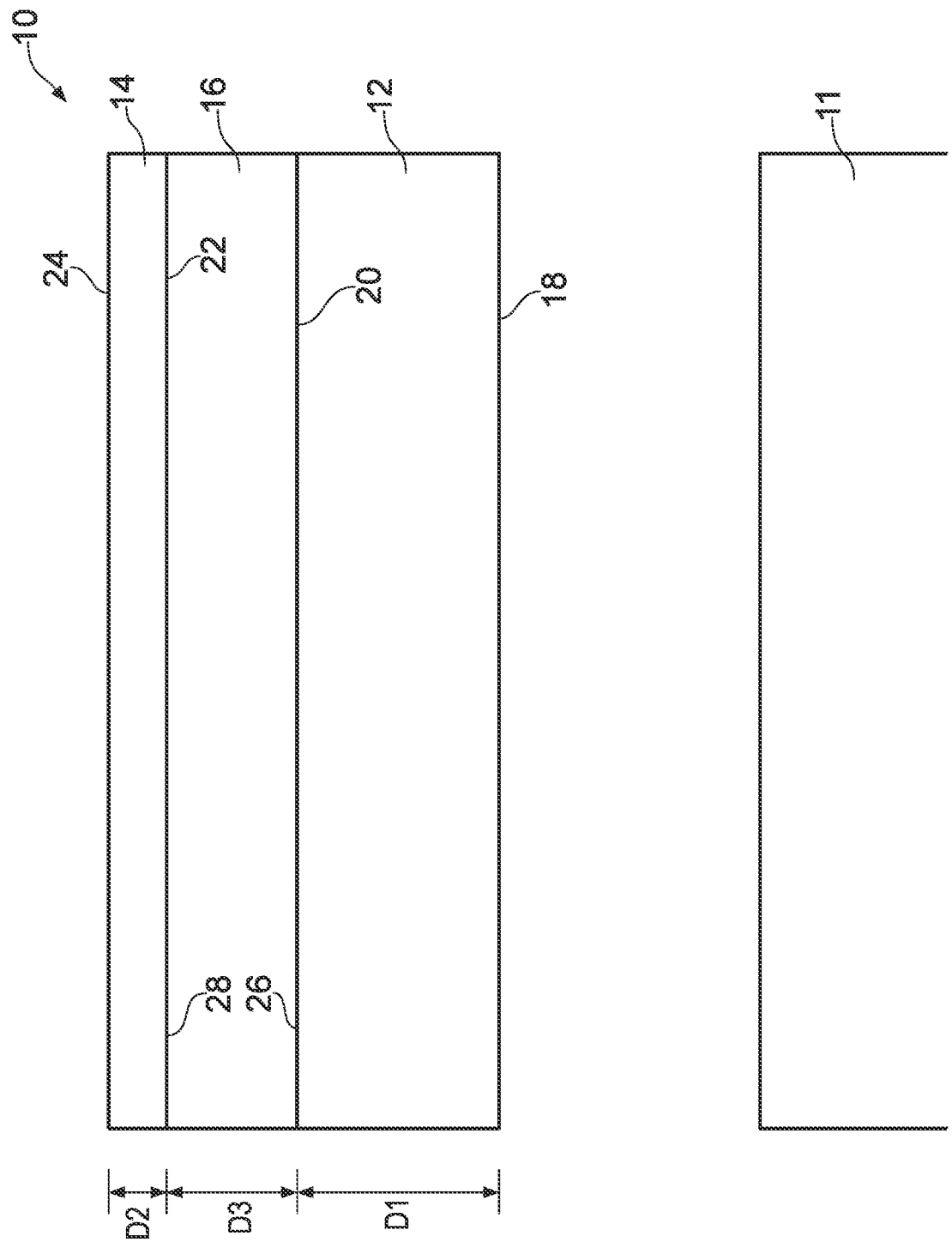
FIG. 1 illustrates a schematic side view diagram of a fairing according to a first example.

FIG. 1 illustrates a fairing 10 for a power generation machine 11 according to a first example. The fairing 10 (which may also be referred to as a cowling in some examples) includes a first layer 12, a second layer 14 and a third layer 16.

The power generation machine 11 may be any suitable machine for generating mechanical power and/or electrical power. For example, the power generation machine 11 may be a gas turbine engine, a reciprocating engine, or an electrical machine such as an electrical motor or an electrical generator.

Figure 5:
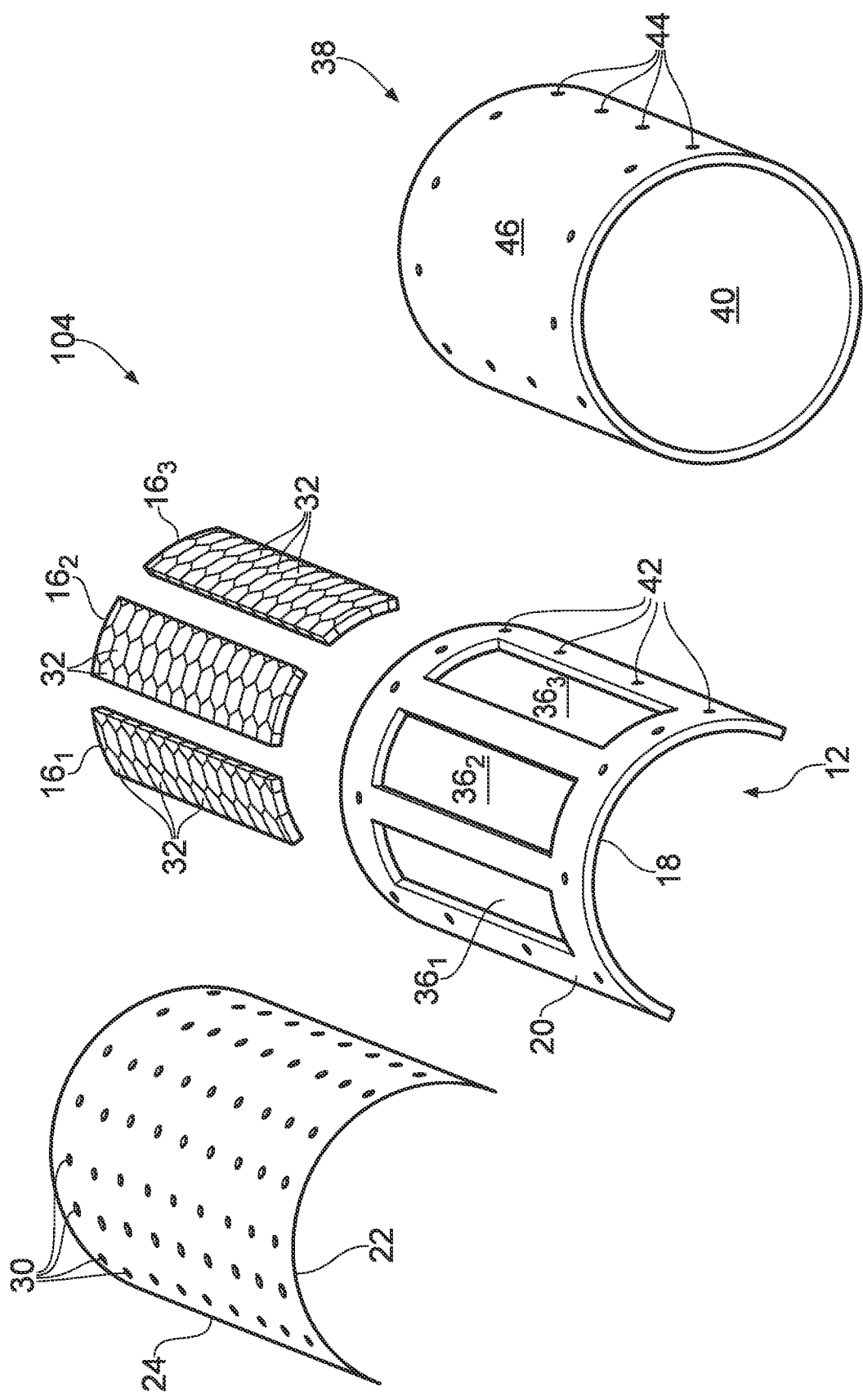
FIG. 5 illustrates a perspective exploded view of a fairing according to a fifth example, and a casing of a power generation machine.

The first layer 12 comprises a metallic material and may comprise, for example, an aluminium or titanium base alloy, or steel. The first layer 12 defines a first surface 18 and a second opposite surface 20 and may have any suitable shape. For example, the first layer 12 may be planar, curved, or have a complex three dimensional shape. In examples where the fairing 10 is for a cylindrical component of a power generation machine (such as a core casing or a bypass duct vane of a gas turbine engine), the cross sectional shape of the fairing 10 may be an arc of a circle or an ellipse (as illustrated in FIG. 5).

The first layer 12 may be configured to enable the fairing 10 to be coupled to the power generation machine 11. For example, the first layer 12 may be configured to couple to the power generation machine 11 via one or more fasteners. In some examples, the first layer 12 may define one or more apertures for receiving one or more fasteners (such as rivets or nuts and bolts) to enable the first layer 12 to be fastened to the power generation machine 11. In other examples, the first layer 12 may comprise one or more spring pins that extend from the first surface 18 and may be inserted into holes within the power generation machine 11 to couple the first layer 12 to the power generation machine 11.

In some examples, the first surface 18 of the first layer 12 may comprise a portion that is shaped to match, and is for adhering to, a surface of the power generation machine 11. For example, where a component of the power generation machine 11 has a cylindrical shape, a portion of the first surface 18 may define an arc of a circle to match the shape of the component and to enable the portion to be adhered to the component.

It should be appreciated that the first layer 12 may be configured to couple to the power generation machine 11 using two or more of the examples mentioned in the preceding paragraphs. For example, the first layer 12 may comprise a plurality of apertures for receiving fasteners, and one or more spring pins for inserting into one or more holes in the power generation machine 11. By way of another example, the first layer 12 may comprise one or more spring pins for inserting into one or more holes in the power generation machine 11, and may also comprise a portion that is shaped to match and be adhered to a surface of the power generation machine 11.

The first layer 12 may be fire resistant and may enable the fairing 10 to comply with International Standard ISO2685:1998 (Aircraft—Environmental test procedure for airborne equipment—resistance to fire in designated fire zones) and thereby provide fire containment for the power generation machine 11. In particular, the metallic material of the first layer 12, the depth (D1) of the first layer 12 and the shape of the first layer 12 may be selected so that the fairing 10 meets, or exceeds, the requirements set out in ISO2685:1998 and FAA AC20-135. For example, the first layer 12 may have a depth of at least 0.038 centimetres and comprise stainless steel. By way of another example, the first layer 12 may have a depth of at least 0.046 centimetres and comprise mild steel protected against corrosion. By way of a further example, the first layer 12 may have a depth of at least 0.041 centimetres and comprise titanium. By way of another example, the first layer 12 may have a depth of at least 0.046 centimetres and comprise Monel.

The second layer 14 comprises a composite material and may comprise, for example, a carbon fibre composite or an oxide ceramic matrix composite. The second layer 14 defines a first surface 22 and a second opposite surface 24, and has a depth D2. The depth D2 of the second layer 14 may be less than the depth D1 of the first layer 12. In some examples, the shape and dimensions of the second layer 14 may be the same as the shape and dimensions of the first layer 12. In other examples, the shape and dimensions of the second layer 14 may be different to the first layer 12. For example, the second layer 14 may be larger than the first layer 12 (that is, have a greater surface area) and may at least partially cover an adjacent first layer of another fairing according to the disclosure.

The second surface 24 of the second layer 14 may define an external surface of the fairing 10. In other words, the second surface 24 of the second layer 14 may interface with the air surrounding the fairing 10 when the fairing 10 is coupled to the power generation machine 11. The second surface 24 may have no protrusions (such as rivets) extending from the second surface 24 to minimize or eliminate excrescence drag. Consequently, in some examples the second surface 22 may be aerodynamically flush and may produce zero excrescence drag.

The third layer 16 defines a first surface 26 and a second surface 28 and has a depth D3 defined between the first and second surfaces 26, 28. The third layer 16 is positioned between the first layer 12 and the second layer 14 and is configured to attenuate acoustic waves over a predetermined frequency range. For example, the third layer 16 may comprise any suitable material and/or any suitable structure and/or any suitable dimensions that enable the fairing 10 to attenuate acoustic waves over a predetermined frequency range. Two different examples of a third layer 16 are described in the following paragraphs with reference to FIGS. 2 and 3.

In some examples, the shape and dimensions of the third layer 16 may be the same as the shape and dimensions of the first layer 12. In other examples, the shape and dimensions of the third layer 16 may be different to the first layer 12. For example, the third layer 16 may be larger than the first layer 12 (that is, have a greater surface area) and may at least partially cover an adjacent first layer of another fairing according to the disclosure. In another example, the third layer 16 may be smaller than the first layer 12 (this is, have a smaller surface area) and a plurality of third layers 16 may be positioned between the first layer 12 and the second layer 14.

The second layer 14 is coupled to the first layer 12 either directly, or indirectly. For example, the second layer 14 and the first layer 12 may be coupled via one or more fasteners (such as one or more springs pins, and/or one or more sunken rivets) or via an adhesive. The third layer 16 may be coupled to the first layer 12 and/or to the second layer 14. For example, the third layer 16 may be adhesively bonded to the first layer 12 and/or to the second layer 14. Where the first layer 12 and the second layer 14 are coupled via fasteners, the fasteners may, or may not extend through the third layer 16. In some examples, the third layer 16 may not be coupled to the first and second layers 12, 14. Consequently, the third layer 16 may be merely sandwiched between the first and second layers 12, 14, and the coupling between the first and second layers 12, 14 may hold the third layer 16 in position.

The fairing 10 may provide several advantages. First, the fairing 10 may provide attenuation of acoustic waves that have frequencies within the predetermined frequency range. For example, where the fairing 10 is mounted on a core engine casing of a turbofan engine, the fairing 10 may advantageously attenuate acoustic waves caused by acoustic resonance of air within the bypass duct of the turbofan engine during operation.

Second, the fairing 10 may provide effective fire containment for the power generation machine 11. In particular, the materials and arrangement of the first layer 12 may enable the fairing 10 to meet, or exceed, ISO2685:1998.

Third, the second surface 22 of the second layer 14 may have few or no protrusions and may thus provide an optimal aerodynamic surface for the fairing 10. Where the power generation machine 11 provides a propulsor for a vehicle, the fairing 10 may thus improve the performance of the vehicle by reducing drag on the vehicle.

Fourth, the first layer 12 may be manufactured with higher engineering tolerances because the first layer 12 may not provide an external surface of the fairing 10 which affects the aerodynamic performance of the fairing 10. This may simplify the manufacturing process for the fairing 10 and may thus reduce the cost of the fairing 10 relative to other fairings.

Fifth, the structure and materials of the fairing 10 may result in the fairing 10 having a relatively low mass. Where the power generation machine 11 and the fairing 10 are mounted on a vehicle, this may advantageously reduce the weight of the vehicle and thus reduce the energy consumption of the power generation machine 11.

Figure 2:
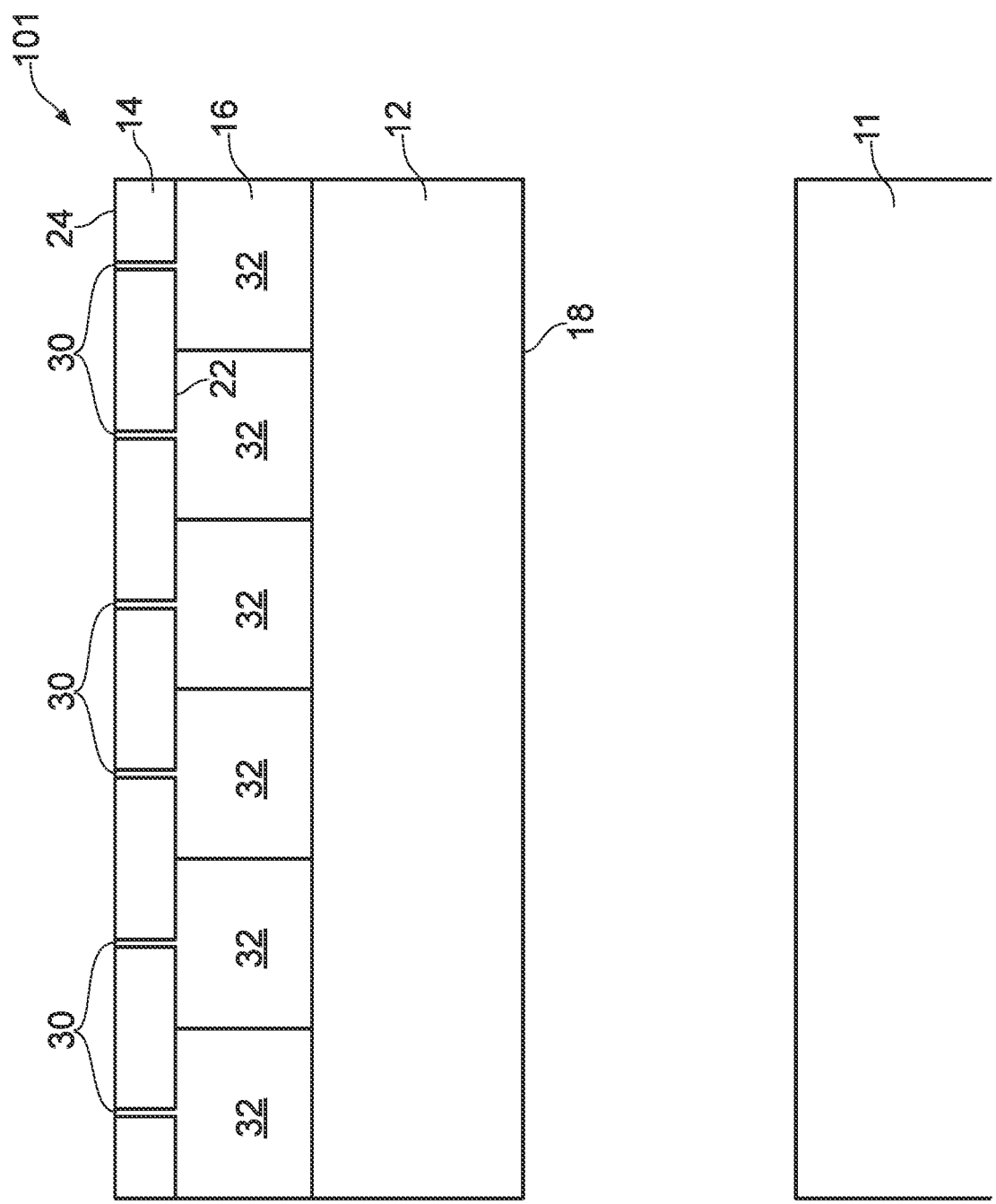
FIG. 2 illustrates a schematic side view diagram of a fairing according to a second example.

FIG. 2 illustrates a schematic side view of a fairing 101 for a power generation machine 11 according to a second example. The fairing 101 is similar to the fairing 10 and where the features are similar, the same reference numerals are used.

In this example, the second layer 14 defines a plurality of apertures 30 and the third layer 16 defines a plurality of cavities 32. The plurality of apertures 30 extend between, and through, the first surface 22 and the second surface 24 of the second layer 14. The plurality of cavities 32 may have any suitable structure and may have, for example, a honeycomb structure as illustrated in FIG. 5.

The plurality of apertures 30 and the plurality of cavities 32 are aligned and together define a plurality of Helmholtz resonators. Each aperture 30 forms a passageway for air to enter a cavity 32 in the third layer 16. The dimensions of the apertures 30 and the cavities 32 are selected so that the Helmholtz resonators attenuate acoustic waves having frequencies within the predetermined frequency range.

Figure 3:
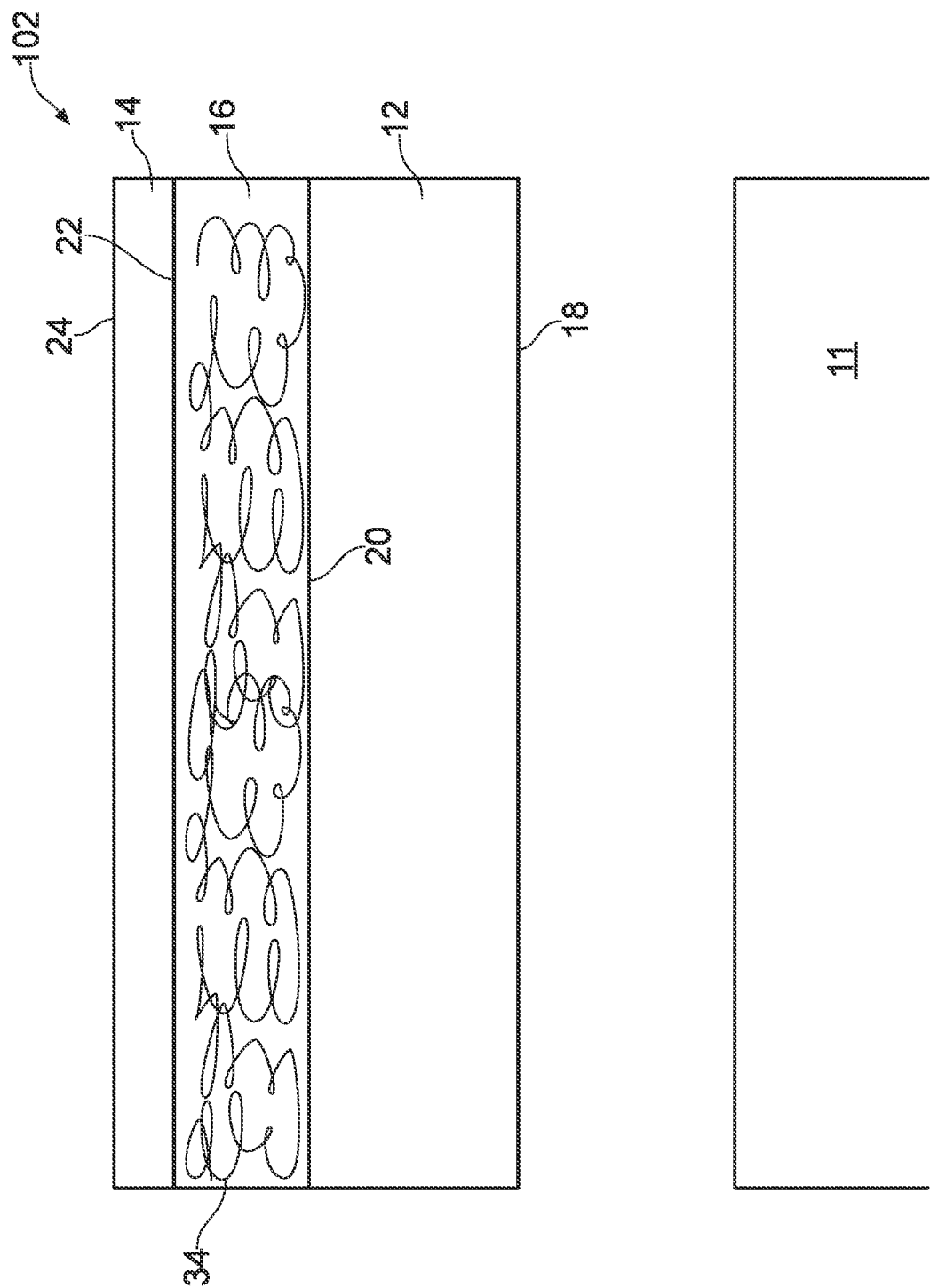
FIG. 3 illustrates a schematic side view diagram of a fairing according to a third example.

FIG. 3 illustrates a schematic side view of a fairing 102 for a power generation machine 11 according to a third example. The fairing 102 is similar to the fairings 10, 101 and where the features are similar, the same reference numerals are used.

In this example, the third layer 16 comprises a mesh 34 that is configured to attenuate acoustic waves over a predetermined frequency range. The mesh 34 includes wire that is arranged to form a plurality of loops. When acoustic waves impinge on the mesh 34, the plurality of loops vibrates and thus converts acoustic energy into thermal energy. The material, thickness of the wire, the dimensions of the plurality of loops, and the density of wire may be selected to enable the mesh 34 to attenuate acoustic waves over the predetermined frequency range.

Figure 4:
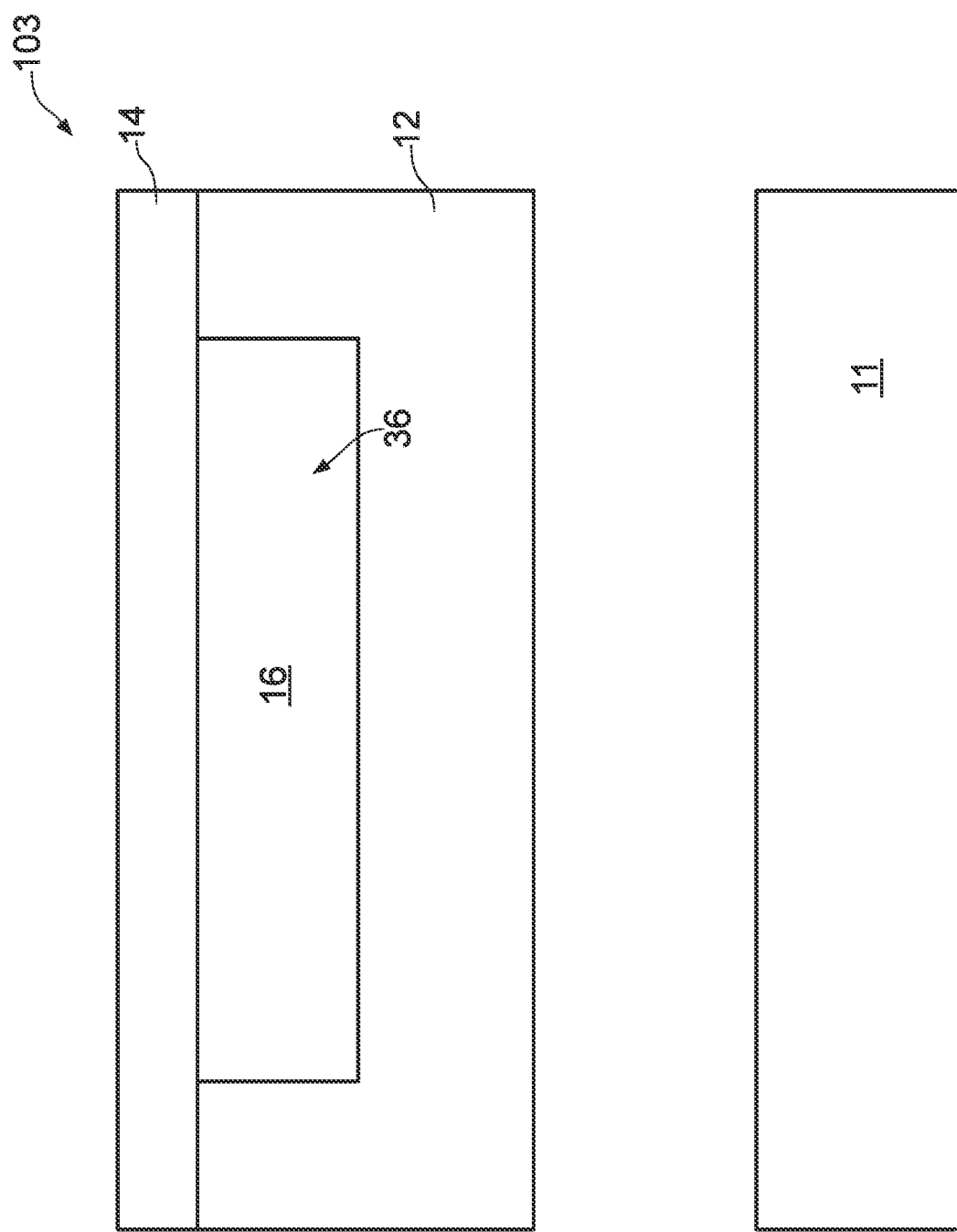
FIG. 4 illustrates a schematic side view diagram of a fairing according to a fourth example.

FIG. 4 illustrates a schematic side view of a fairing 103 for a power generation machine 11 according to a fourth example. The fairing 103 is similar to the fairings 10, 101, 102 and where the features are similar, the same reference numerals are used.

In this example, the first layer 12 defines a receptacle 36 and the third layer 16 is positioned within the receptacle 36. The receptacle 36 may have any suitable shape and dimensions for enabling the third layer 16 positioned therein to attenuate acoustic waves over the desired frequency range. In some examples, the first layer 12 may define a plurality of receptacles 36, and a third layer 16 may be positioned in each of the receptacles (as illustrated in FIG. 5). In further examples, a plurality of third layers 16 may be positioned within a single receptacle 36.

FIG. 5 illustrates a perspective exploded view of a fairing 104 according to a fifth example, and a casing 38 of a power generation machine. The fairing 104 is similar to the fairings 101 & 103 and where the features are similar, the same reference numerals are used. The casing 38 has a cylindrical shape and defines a cavity 40 for receiving other components of the power generation machine therein. For example, where the casing 38 is a core engine casing of a turbofan engine, the casing 38 is shaped to receive at least a part of a core engine therein.

The cross sectional shape of the first layer 12 is an arc of a circle and consequently, the first surface 18 has a concave shape and the second surface 20 has a convex shape. The cross sectional shape of the second layer 14 is also an arc of a circle and consequently, the first surface 22 has a concave shape and the second surface 24 has a convex shape.

The first layer 12 defines a plurality of apertures 42 and the casing 38 defines a plurality of apertures 44. The first layer 12 may be coupled to the casing 38 by inserting a plurality of fasteners (such as rivets) through the apertures 42 and the apertures 44. Once coupled, the first surface 18 of the first layer 12 may abut or be in close proximity to an exterior surface 46 of the casing 38.

The first layer 12 includes a first receptacle $36_1$, a second receptacle $36_2$ and a third receptacle $36_3$. Third layers $16_1$, $16_2$, $16_3$ are shaped to fit snugly within the respective first, second and third receptacles $36_1$, $36_2$, $36_3$. The third layers $16_1$, $16_2$, $16_3$ may each comprise a honeycomb structure and thus define a plurality of cavities 32. In other examples, the third layers $16_1$, $16_2$, $16_3$ may each comprise a mesh as illustrated in FIG. 3, or may comprise a mixture of honeycomb structures and meshes. In assembly, the third layers $16_1$, $16_2$, $16_3$ are inserted into the first, second and third receptacles $36_1$, $36_2$, $36_3$ respectively, and may be adhesively bonded to the second surface 20 of the first layer 12.

The second layer 14 may then be coupled to the first layer 12 via one or more fasteners or via an adhesive. In some examples, the first surface 22 of the second layer 14 may also be adhesively bonded to the third layers $16_1$, $16_2$, $16_3$. The plurality of apertures 30 of the second layer 14 are aligned with the cavities 32 of the third layers $16_1$, $16_2$, $16_3$ and form a plurality of Helmholtz resonators.

The shape of the first surface 18 of the first layer 12 is manufactured so that at least a portion of the first surface 18 matches the shape of the exterior surface 46 of the casing 38. Consequently, the first layer 12 of the fairing 104 may additionally or alternatively be coupled to the casing 38 via adhesive.

It should be appreciated that a single fairing 104 is illustrated in FIG. 5 to maintain the clarity of the figures and that a plurality of the fairings 104 may be used to completely cover the exterior surface 46 of the casing 38.

Figure 6:
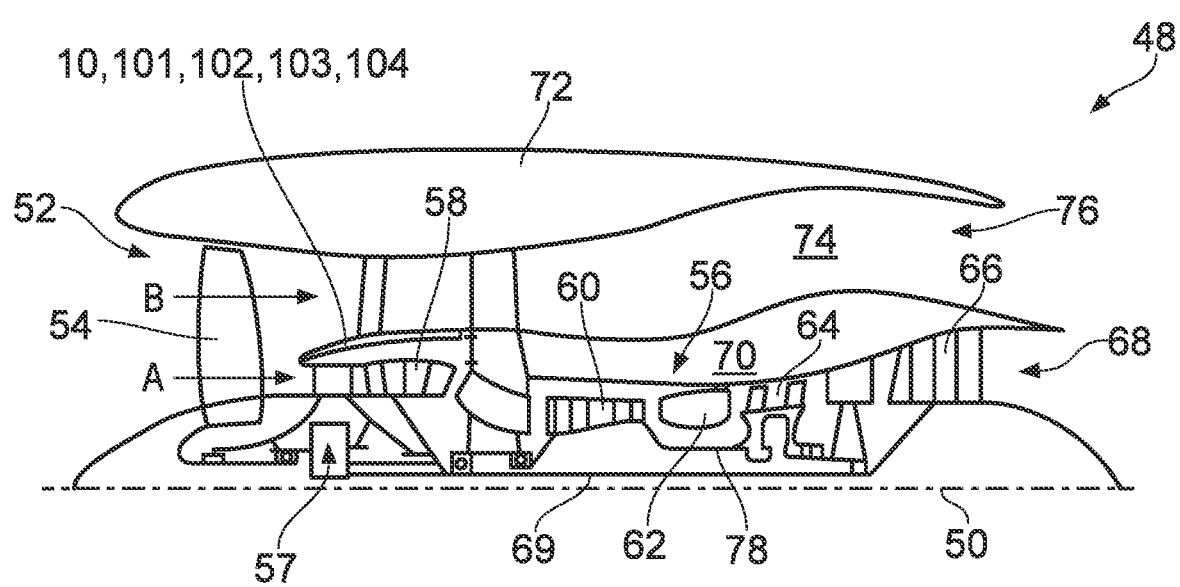
FIG. 6 illustrates a cross sectional side view of a gas turbine engine according to an example.

FIG. 6 illustrates a gas turbine engine 48 having a principal rotational axis 50 and comprising an air intake 52 and a propulsive fan 54 that generates two airflows A and B. The gas turbine engine 48 comprises a core engine 56 including an epicyclic gearbox 57, a low pressure compressor 58, a high-pressure compressor 60, combustion equipment 62, a high-pressure turbine 64, a low pressure turbine 66 and a core exhaust nozzle 68. The propulsive fan 54 is attached to and driven by the low pressure turbine 66 via a shaft 69 and the epicyclic gearbox 57.

A core casing 70 surrounds the low pressure compressor 58, the high-pressure compressor 60, the combustion equipment 62, the high-pressure turbine 64, and the low pressure turbine 66. A nacelle 72 surrounds the propulsive fan 54 and the core engine 56 and defines a bypass duct 74 and a bypass exhaust nozzle 76.

In operation, air in the core airflow A is accelerated and compressed by the low pressure compressor 58 and directed into the high pressure compressor 60 where further compression takes place. The compressed air exhausted from the high pressure compressor 60 is directed into the combustion equipment 62 where it is mixed with fuel and the mixture is combusted. The resultant hot combustion products then expand through, and thereby drive the high pressure and low pressure turbines 64, 66 before being exhausted through the nozzle 68 to provide propulsive thrust. The high pressure turbine 64 drives the high pressure compressor 60 by an interconnecting shaft 78. The fan 54 generally provides the majority of the propulsive thrust. The epicyclic gearbox 57 is a reduction gearbox.

Additionally or alternatively, the output from the epicyclic gearbox 57 may drive additional and/or alternative components. For example, the output from the epicyclic gearbox 57 may drive the low pressure compressor 58 and/or a booster compressor, propeller (aero or hydro), or an electrical generator. Additionally or alternatively, such engines may have an alternative number of compressors and/or turbines and/or an alternative number of interconnecting shafts.

One or more fairings 10, 101, 102, 103, 104 are coupled to the core casing 70 and axially overlap the low pressure compressor 58. In other examples, one or more fairings 10, 101, 102, 103, 104 may additionally or alternatively be coupled to the core casing 70 at another location on the core casing 70. For example, one or more fairings 10, 101, 102, 103, 104 may be coupled to the core casing 70 and axially overlap one or more of the low pressure compressor 58, high pressure compressor 60, the combustion equipment 62, the high pressure turbine 64, and the low pressure turbine 66.

The one or more fairings 10, 101, 102, 103, 104 may be advantageous in that they may attenuate acoustic waves caused by acoustic resonance of air within the bypass duct 74. This may reduce the noise produced by the gas turbine engine 48. Additionally, the one or more fairings 10, 101, 102, 103, 104 may cause less drag on air flowing through the bypass duct 74 and may thus improve the performance of the gas turbine engine 48.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A fairing for a power generation machine, the fairing comprising:
   a first layer comprising a metallic material and defining a first surface and an opposite second surface, the first layer being configured for coupling the fairing to the power generation machine via one or more fasteners, wherein the first surface of the first layer has a concave shape, and wherein the first layer defines one or more receptacles open to the power generation machine;
   a second layer comprising a composite material, wherein the second layer defines a first surface and a second opposite surface, the second surface of the second layer defining an external surface of the fairing, the second surface of the second layer having a convex shape; and
   a third layer positioned within the one or more receptacles, the third layer being configured to attenuate acoustic waves over a predetermined frequency range.

2. A fairing as claimed in claim 1, wherein the second layer defines a plurality of apertures and the third layer defines a plurality of cavities, the plurality of apertures and cavities are aligned and define a plurality of Helmholtz resonators.

3. A fairing as claimed in claim 2, wherein the third layer comprises a honeycomb structure.

4. A fairing as claimed in claim 1, wherein the third layer comprises a wire mesh arranged to form a plurality of loops, wherein the wire is selected to attenuate the acoustic waves over the predetermined frequency range by converting acoustic energy to thermal energy.

5. A fairing as claimed in claim 1, wherein the third layer is bonded to the first layer.

6. A fairing as claimed in claim 1, wherein the first surface of the first layer comprises a portion that is shaped to match a surface of the power generation machine, the portion for being adhered to the power generation machine.

7. A fairing as claimed in claim 1, wherein the second layer defines a first surface and a second opposite surface, the second surface of the second layer defining an external surface of the fairing.

8. A fairing as claimed in claim 1, wherein the first layer is configured to enable the fairing to comply with ISO2685: 1998.

9. A fairing as claimed in claim 1, wherein the second layer comprises no protrusions extending from the second surface of the second layer to minimize excrescence drag.

10. A fairing as claimed in claim 1, wherein the metallic material of the first layer comprises aluminium or titanium.

11. A fairing as claimed in claim 1, wherein the composite material of the second layer comprises a carbon composite or an oxide ceramic matrix composite.

12. Apparatus comprising: a power generation machine; and a fairing as claimed in claim 1, the first layer of the fairing being coupled to the power generation machine.

13. Apparatus as claimed in claim 12, wherein the power generation machine is a gas turbine engine.

14. Apparatus as claimed in claim 12, wherein the power generation machine is an electrical machine.

* * * * *